(12) United States Patent
Chiang

(10) Patent No.: US 7,970,442 B2
(45) Date of Patent: Jun. 28, 2011

(54) CHAIN-SHAPED FOLDABLE CELLPHONE

(76) Inventor: Akina Chiang, Xizhi (TW)

(*) Notice: Subject to any disclaimer, the term of this patent is extended or adjusted under 35 U.S.C. 154(b) by 764 days.

(21) Appl. No.: 11/907,729

(22) Filed: Oct. 17, 2007

(65) Prior Publication Data

US 2009/0104932 A1 Apr. 23, 2009

(51) Int. Cl.
*H04M 1/00* (2006.01)
(52) U.S. Cl. .................. 455/575.1; 455/575.3; 455/90.2
(58) Field of Classification Search .................. None
See application file for complete search history.

(56) References Cited

U.S. PATENT DOCUMENTS

| 7,489,503 B2* | 2/2009 | Maatta ..................... 361/679.27 |
| 2006/0019714 A1* | 1/2006 | Lee et al. ....................... 455/566 |

* cited by examiner

*Primary Examiner* — Erika A Gary
(74) *Attorney, Agent, or Firm* — Bacon & Thomas, PLLC

(57) ABSTRACT

A chain-shaped foldable cellphone capable of expanding functions and changing shape during usage comprises a mainframe module, a display module, more than one dual-spindle connecting block and an expansible module or an extensive module, wherein the extensive module is a complementary connector of the expansible module, and the neighboring ends of the two modules can be connected mutually while the distant ends thereof can be connected to one of the spindles of one dual-spindle connecting block respectively; by using the pivotal connection of the dual-spindle connecting block, the mainframe module is pivotally connected to the display module, and a plurality of extensive module and expansible module of various functions can be further pivotally connected to construct a chain-shaped foldable cellphone.

5 Claims, 5 Drawing Sheets

CHAIN-SHAPED FOLDABLE CELLPHONE

BACKGROUND OF THE INVENTION

1. Field of the Invention

The invention relates to a chain-shaped foldable cellphone, and more particularly, to a chain-shaped foldable cellphone capable of extending functions and changing shape during usage.

2. Description of the Related Art

In the prior art, a foldable cellphone generally has a display module and a mainframe module, and the display module is pivotally connected with the mainframe module by a single spindle. Therefore, the foldable cellphone has advantages of being small in size and portable because the display module can lift 180 degree upwardly relatively to the mainframe module or cover the mainframe module.

Another conventional foldable cellphone also has a display module and a mainframe module; nevertheless, the display module and the mainframe module are respectively pivotally connected to each of the spindles of a dual-spindle connecting block. The display module of such foldable cellphone has an angle of usage adjustable from 0 to 360 degree, and more particularly, uses and functions of the foldable cellphone can be expanded and improved by folding reversely 360 degree of the display module to the back of the mainframe module.

Nevertheless, above-mentioned conventional cellphones are not capable of folding obversely or reversely to change the shape during usage.

SUMMARY OF THE INVENTION

One object of the present invention is to provide a chain-shaped foldable cellphone capable of expanding functions and changing shape during usage, comprising a mainframe module, a display module, more than one dual-spindle connecting block and an expansible module or an extensive module, wherein the expansible module is selected from the group consisting of a digital camera module, a power supply module, a memory module, a bluetooth module, a GPS module, a MP3 module and an adjustable belt module. Besides, the extensive module is a complementary connector of the expansible module, and the neighboring ends of the two modules can be connected mutually while the distant ends thereof can be connected to one of the spindles of one dual-spindle connecting block respectively. By using the pivotal connection of the dual-spindle connecting block, not only the mainframe module is pivotally connected to the display module, but also a plurality of extensive module and expansible module of various functions can be further pivotally connected, so as to construct a chain-shaped foldable cellphone capable of expanding functions and changing shape during usage.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE PREFERRED EMBODIMENT

Figure 1:
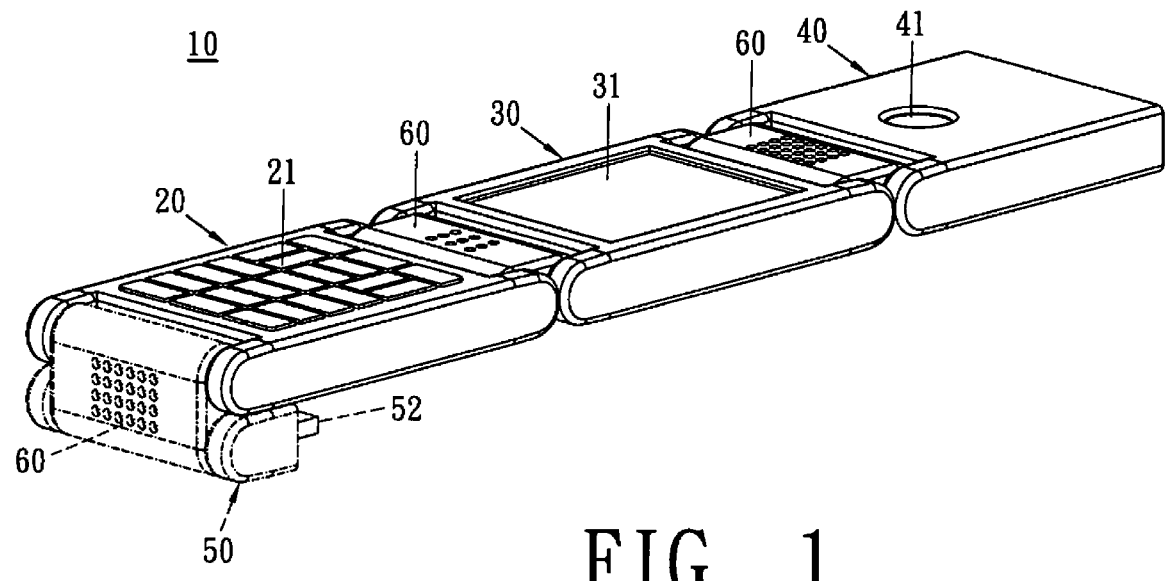
FIG. 1 is a perspective view showing the first basic structure of the chain-shaped foldable cellphone according to one preferred embodiment of the present invention.
Figure 2:
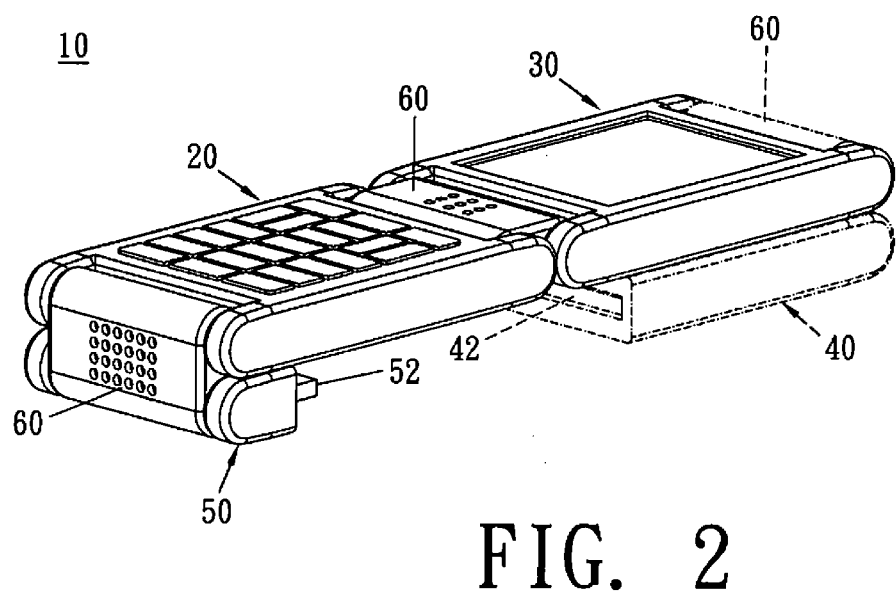
FIG. 2 is a perspective view showing the second basic structure of the chain-shaped foldable cellphone according to another preferred embodiment of the present invention.
Figure 3:
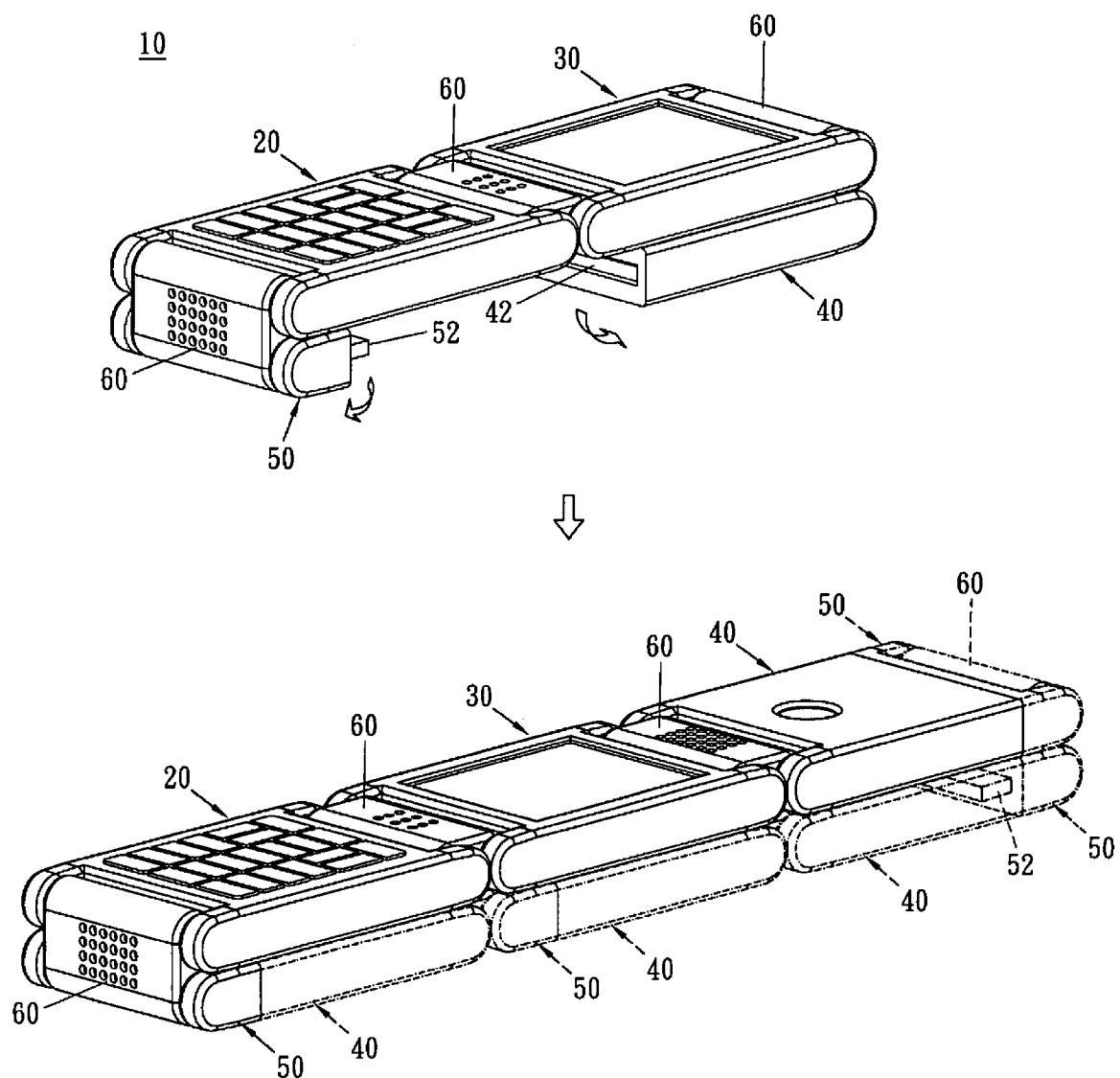
FIG. 3 is a perspective view showing the third basic structure of the chain-shaped foldable cellphone according to still another preferred embodiment of the present invention.

As shown from FIG. 1 to FIG. 3, the chain-shaped foldable cellphone 10 according to the preferred embodiment of the present invention has three different basic structures; however, all of the three are capable of extending functions and changing shape during usage.

As shown in FIG. 1, the basic structure of the first preferred embodiment includes a mainframe module 20, a display module 30, an expansible module 40 and two dual-spindle connecting blocks 60 pivotally connected, wherein the mainframe module 20 is pivotally connected to the display module 30 by using a dual-spindle connecting block 60. The expansible module 40 is pivotally connected to the mainframe module 20 or the display module 30 by using the other dual-spindle connecting block 60.

Figure 5:
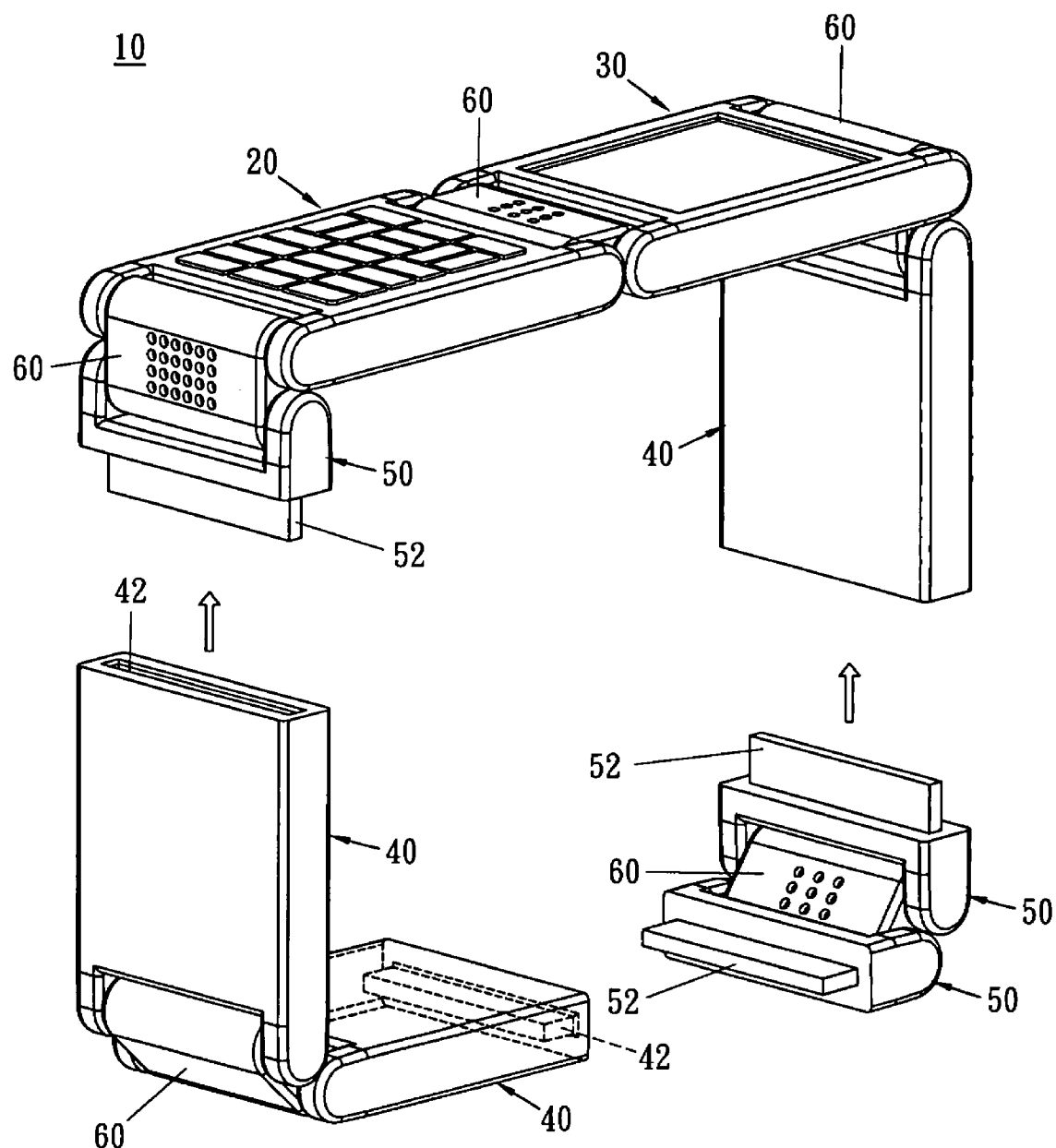
FIG. 5 is a perspective view showing that the chain-shaped foldable cellphone expands functions and changes shape during usage by using an expansible module or an extensive module.
Figure 6:
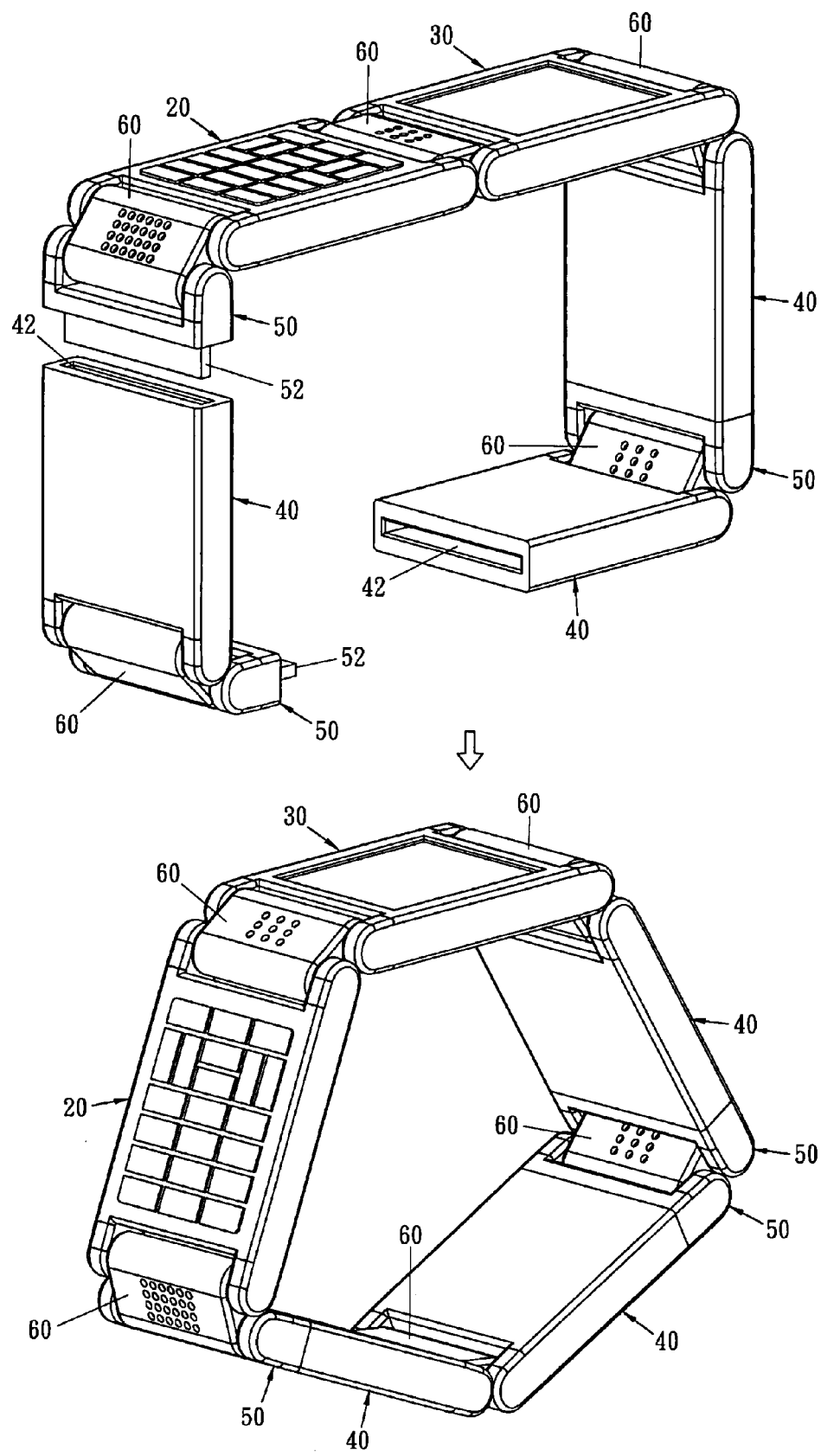
FIG. 6 is a perspective view showing the chain-shaped foldable cellphone becomes a pentagonal cellphone by using an expansible module or an extensive module.

As shown in FIG. 5 and FIG. 6, an expansible module 40 of the chain-shaped foldable cellphone 10 can be connected to another extensive module 50; moreover, by connecting another dual-spindle connecting block 60, the extensive module 50 connected can further be connected to still another expansible module 40 or extensive module 50 so as to expand the uses of the chain-shaped foldable cellphone 10 and change the shape during usage.

As shown in FIG. 2, the basic structure of the second preferred embodiment includes a mainframe module 20, a display module 30, an extensive module 50 and two dual-spindle connecting blocks 60 pivotally connected, wherein the mainframe module 20 is pivotally connected to the display module 30 by using a dual-spindle connecting block 60. The extensive module 50 is pivotally connected to the mainframe module 20 or the display module 30 by using the other dual-spindle connecting block 60.

As shown in FIG. 5 and FIG. 6, an extensive module 50 of the chain-shaped foldable cellphone 10 can be connected to another expansive module 40; moreover, by connecting another dual-spindle connecting block 60, the expansible module 40 connected can further be connected to still another expansible module 40 or extensive module 50 so as to expand the uses of the chain-shaped foldable cellphone 10 and change the shape during usage.

As shown in FIG. 3, the basic structure of the third preferred embodiment includes a mainframe module 20, a display module 30, an expansible module 40, a extensive module 50 and three dual-spindle connecting blocks 60 pivotally connected, wherein the mainframe module 20 is pivotally connected to the display module 30 by using a dual-spindle connecting block 60. The expansible module 40 is pivotally connected to the mainframe module 20 or the display module 30 by using another dual-spindle connecting block 60. Similarly, the extensive module 50 is pivotally connected to the mainframe module 20 or the display module 30 by using still another dual-spindle connecting block 60.

As shown in FIG. 5 and FIG. 6, the extensive module 50 of the chain-shaped foldable cellphone 10 can be connected to another expansible module 40, and the expansible module 40 of the chain-shaped foldable cellphone 10 can be further connected to another extensive module 50; besides, by connecting a dual-spindle connecting block 60 respectively, the expansible module 40 or the extensive module 50 connected can further be connected to still another expansible module 40 or the extensive module 50 so as to expand the uses of the chain-shaped foldable cellphone 10 and change the shape during usage.

Figure 4:
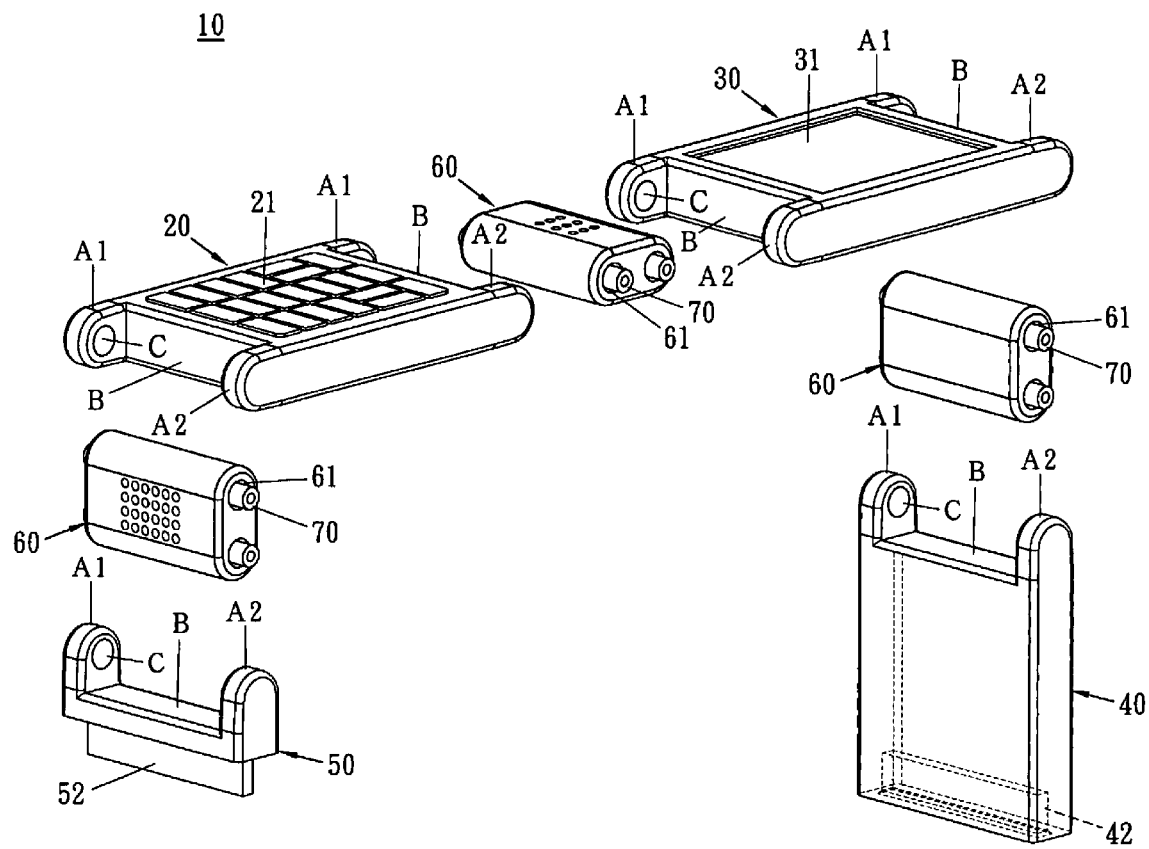
FIG. 4 is a partly exploded view showing the chain-shaped foldable cellphone according to one preferred embodiment of the present invention.

As shown in FIG. 4, each connecting block 60 has two pivotal holes 61 for a spindle 70 to be disposed therein respectively to construct a double-pivot structure; besides, the connecting block 60 can have a flexible flat cable or PCB disposed therein for the connecting block 60 to have voice receiving or transmitting function, or be provided with a digital camera lens or a USB socket.

As shown in FIG. 5, the extensive module 50 is a complementary connector of the expansible module 40. The neighboring ends of the two modules can be connected mutually while the distant ends thereof can be connected to one of the spindles 70 of one dual-spindle connecting block 60 respectively.

For example, when a socket 42 is disposed at one end of the expansible module 40, a corresponding tenon 52 is disposed at one end of the extensive module 50. By the connection of the tenon 52 and the socket 42, the expansible module 40 and the extensive module 50 can be connected to be used. Similarly, when a tenon (not shown in the figure) is disposed at one end of the expansible module 40, a corresponding socket (not shown in the figure) is disposed at one end of the extensive module 50.

One or two ends of the mainframe module 20 and the display module 30 are used as connecting ends, while one end of the expansible module 40 and the extensive module 50 is used as a connecting end; wherein each connecting end has a connecting groove B and a pair of pivotal connecting parts A1 and A2. The connecting groove B is for the corresponding connecting block 60 to be pivotally disposed therein; besides, a round slot C is disposed respectively at two lateral faces of the connecting parts A1 and A2 facing the pivotal connecting groove B for pivotally receiving one of the spindle 70 of the dual-spindle connecting block 60. Therefore, as shown in FIG. 5, the mainframe module 20 and the display module 30 can be pivotally connected by using the two spindles 70 of the dual-spindle connecting block 60. Similarly, the expansible module 40 or the extensive module 50 can be pivotally connected to the mainframe module 20 and the display module 30 by using the two spindles 70 of the dual-spindle connecting block 60. Similarly, as shown in FIG. 5 and FIG. 6, the expansible module 40 or the extensive module 50 can be further connected to still another expansible module 40 or extensive module 50 by using the two spindles 70 of the dual-spindle connecting block 60.

The mainframe module 20 is a cellphone module with an information receiving or transmitting function and has press-type or touch-type buttons 21 for controlling information outputting or inputting.

The display module 30 is a cellphone module with an information display function and has a screen 31 for displaying information inputted/outputted.

The expansible module 40 is a cellphone module for expanding uses of the chain-shaped foldable cellphone 10 of the present invention and can be an electronic equipment module of certain purpose or a connecting module without electronic functions. The expansible module 40 is suitable to be selected from the group consisting of a digital camera module with a lens 41 as shown in FIG. 1, a power supply module, a memory module, a bluetooth module, a GPS module and a MP3 module. The connecting module without electronic functions can be an adjustable belt module. A consumer can use the adjustable belt module to attach the chain-shaped foldable cellphone 10 around the waist or carry it slantwise on the shoulder.

When the expansible module 40 of the chain-shaped foldable cellphone 10 is a power supply module or a memory module, the power capacity or memory capacity of the chain-shaped foldable cellphone 10 of the present invention is doubled. Otherwise, as shown in FIG. 3, when the chain-shaped foldable cellphone 10 in the third preferred embodiment is connected to three expansible modules 40, three extensive modules 50 and three dual-spindle connecting blocks 60, a cellphone capable of folding or stretching obversely or reversely is constructed.

Otherwise, as shown in FIG. 6, when the chain-shaped foldable cellphone 10 in the third preferred embodiment is connected to two expansible modules 40, two extensive modules 50 and two dual-spindle connecting blocks 60, a pentagonal cellphone is constructed.

Accordingly, the chain-shaped foldable cellphone 10 according to the present invention is capable of extending functions and changing shape during usage.

Although above particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. A chain-shaped foldable cellphone, comprising:
a mainframe module for receiving or transmitting information;
a display module for displaying the information received or transmitted by the mainframe module; and
a first dual-spindle connecting block for pivotally connecting spindles respectively to the mainframe module and the display module,
wherein a first end of the mainframe module or the display module is further pivotally connected to a first spindle of a second dual-spindle connecting block, and a second spindle of the second dual-spindle connecting block is pivotally connected to a first expansible module, and
wherein the first expansible module is connected to a first extensible module, which functions as a complementary connector; the first extensible module is further connected to a third dual-spindle connecting block; and a second expansible module or a second extensible module is further connected.

2. The chain-shaped foldable cellphone as cited in claim 1, wherein a second end of the mainframe module or the display module is further pivotally connected to a first spindle of a fourth dual-spindle connecting block, and a second spindle of the fourth dual-spindle connecting block is pivotally connected to a third extensible module.

3. The chain-shaped foldable cellphone as cited in claim 2, wherein the first or second expansible module is selected from the group consisting of a digital camera module, a power supply module, a memory module, a bluetooth module, a GPS module, a MP3 module and an adjustable belt module.

4. The chain-shaped foldable cellphone as cited in claim 1, wherein the first or second expansible module is selected from the group consisting of a digital camera module, a power supply module, a memory module, a bluetooth module, a GPS module, a MP3 module and an adjustable belt module.

5. A chain-shaped foldable cellphone, comprising:
- a mainframe module for receiving or transmitting information;
- a display module for displaying the information received or transmitted by the mainframe module; and
- a first dual-spindle connecting block for pivotally connecting spindles respectively to the mainframe module and the display module, wherein a first end of the mainframe module or the display module is further pivotally connected to a first spindle of a second dual-spindle connecting block, and a second spindle of the second dual-spindle connecting block is pivotally connected to a first extensible module, and wherein the first extensible module is connected to a first expansible module, which functions as a complementary connector, and the first expansible module is further connected to a third dual-spindle connecting block, and a second expansible module or a second extensible module is further connected.

\* \* \* \* \*